United States Patent [19]
Asai et al.

[11] Patent Number: 6,048,822
[45] Date of Patent: *Apr. 11, 2000

[54] POLYESTER RESIN AND SUBLIMATION TRANSFER IMAGE RECEIVER USING SAME

[75] Inventors: Haruo Asai; Toshiyuki Shimizu; Yoshio Araki, all of Ohtsu, Japan

[73] Assignee: Toyo Boseki Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/836,615

[22] PCT Filed: Aug. 28, 1996

[86] PCT No.: PCT/JP96/02421

§ 371 Date: Apr. 30, 1997

§ 102(e) Date: Apr. 30, 1997

[87] PCT Pub. No.: WO97/09368

PCT Pub. Date: Mar. 13, 1997

[30] Foreign Application Priority Data

Sep. 1, 1995 [JP] Japan ................................. 7-225432
Aug. 13, 1996 [JP] Japan ................................. 8-213632

[51] Int. Cl.[7] ...................... B41M 5/124; B32B 27/06; B32B 27/36
[52] U.S. Cl. .................... 503/216; 503/200; 503/227; 428/480
[58] Field of Search ................. 525/39, 43, 44; 523/500, 522; 528/192; 503/227, 216; 428/480; 524/601

[56] References Cited

U.S. PATENT DOCUMENTS

| | | | |
|---|---|---|---|
| 3,760,034 | 9/1973 | Critchfield et al. | 523/522 |
| 4,783,375 | 11/1988 | Hashimoto et al. | 428/480 |
| 4,895,830 | 1/1990 | Takeda et al. | 428/480 |
| 5,128,311 | 7/1992 | Egashira et al. | 503/227 |
| 5,446,082 | 8/1995 | Asai et al. | 524/601 |
| 5,656,681 | 8/1997 | Shimizu et al. | 525/39 |

FOREIGN PATENT DOCUMENTS

| | | |
|---|---|---|
| 0 481 130 A1 | 10/1990 | European Pat. Off. . |
| 61-115917 | 6/1986 | Japan . |
| 61-231015 | 10/1986 | Japan . |
| 1-259989 | 10/1989 | Japan . |
| 3-147892 | 6/1991 | Japan . |

*Primary Examiner*—Tae Yoon
*Attorney, Agent, or Firm*—Morrison & Foerster LLP

[57] ABSTRACT

A polyester resin having a glass transition temperature of not less than 15° C. and a reduced viscosity of 0.15–1.5, which comprises a graft polymer comprising a polyester having an unsaturated bond as a main chain, and a radical polymerizable unsaturated monomer as a side chain, and a sublimation transfer image receiver which comprises a dyeable layer mainly comprising a dyeable resin comprising the polyester resin. Inasmuch as the polyester resin can provide highly sensitive images without the use of a plasticizer or an additive, it is suitable as a dyeable resin for a sublimation transfer image receiver. The images obtained by the use of a sublimation transfer image receiver having a dyeable layer containing this resin are superior in durability and preservation stability.

5 Claims, No Drawings

POLYESTER RESIN AND SUBLIMATION TRANSFER IMAGE RECEIVER USING SAME

TECHNICAL FIELD

The present invention relates to a polyester resin suitably used as a dyeable resin of a dyeable layer of a sublimation transfer image receiver used in combination with a heat transfer sheet containing a sublimation dye, and a sublimation transfer image receiver having a dyeable layer comprising a dyeable resin containing said polyester dyeable resin as a main component.

BACKGROUND ART

A sublimation heat transfer method forms printed images by heating a heat transfer sheet applied with a sublimation dye by a thermal head and the like, thereby transferring the sublimation dye onto a sublimation transfer image receiver which comes in contact with the heat transfer sheet.

The dyeable resin to be used for the dyeable layer of said sublimation transfer image receiver has been conventionally one mainly containing a saturated polyester, as disclosed in, for example, Japanese Patent Unexamined Publication Nos. 107885/1982, 64899/1985, 258790/1986 and 105679/1987.

While a sublimation transfer image receiver using a saturated polyester as the dyeable resin can provide high quality images superior in gradation and color reproduction, it is becoming insufficient in dye sensitivity due to the acceleration of the printing speed of a printer. Then, the dyeing sensitivity of the image receiver has been improved by adding various plasticizers and/or additives to a saturated polyester resin. However, plasticizers and additives have poor compatibility with polyester resins, and particularly when a printed image receiver is preserved for an extended period of time, the printed images tend to become blurred or plasticizers and additives precipitate on the surface of the image receiver with the lapse of time.

While the dyeing sensitivity has been improved by lowering the glass transition temperature of a polyester through modification of the resin skeleton, this method exerts adverse influence on heat resistance, thus resulting in blurred images or changes in the color of dye after dyeing.

An object of the present invention is to overcome such conventional defects and provide a polyester resin suitable as a dyeable resin for a sublimation transfer image receiver, which can make images highly sensitive without using a plasticizer or additive.

Another object of the present invention is to provide a sublimation transfer image receiver containing the above-mentioned dyeable resin.

DISCLOSURE OF THE INVENTION

With the aim of achieving the above-mentioned objects, the present inventors have conducted intensive studies of a dyeable resin which forms a dyeable layer of a sublimation transfer image receiver, and found that when the following polyester resin is used as a dyeable resin which forms a dyeable layer of a sublimation transfer image receiver to be used in a sublimation transfer process, a highly sensitive image can be obtained, which resulted in the completion of the invention.

That is, the present invention provides a polyester resin having a glass transition temperature of not less than 15° C. and a reduced viscosity of 0.15–1.5, which comprises a graft polymer comprising a polyester having an unsaturated bond as a main chain and a radical polymerizable unsaturated monomer as a side chain; and a sublimation transfer image receiver comprising a substrate and a dyeable layer mainly comprising a dyeable resin containing the above-mentioned polyester resin, which is formed on said substrate.

In the present invention, the polyester to be used for the main chain has a weight average molecular weight within the range of 500–200000. The dicarboxylic acid component in the composition of said polyester preferably comprises an aromatic dicarboxylic acid and/or alicyclic dicarboxylic acid in a proportion of 60–100 mol % of the total acid component and the aliphatic dicarboxylic acid in a proportion of 0–40 mol % of the total acid component.

Examples of aromatic dicarboxylic acid include aromatic dicarboxylic acids such as terephthalic acid, isophthalic acid, orthophthalic acid, naphthalene dicarboxylic acid, biphenyl dicarboxylic acid, diphenic acid, sulfoterephthalic acid, 5-sulfoisophthalic acid, 4-sulfophthalic acid, 4-sulfonaphthalene-2,7-dicarboxylic acid, 5[4-sulfophenoxy]isophthalic acid and sulfoterephthalic acid, metal salts thereof, ammonium salt thereof and the like; aromatic oxycarboxylic acids such as p-oxybenzoic acid and p-(hydroxyethoxy)benzoic acid; and the like. Examples of alicyclic dicarboxylic acid include 1,4-cyclohexane dicarboxylic acid, 1,3-cyclohexane dicarboxylic acid, 1,2-cyclohexane dicarboxylic acid, anhydrides thereof and the like, and examples of aliphatic dicarboxylic acid include succinic acid, adipic acid, azelinic acid, sebacic acid, dodecanedione acid, dimer acid and the like.

It is preferable that the glycol component comprise aliphatic glycol, alicyclic glycol, aromatic group-containing glycol, ether bond-containing glycol and the like. Examples of aliphatic glycol include ethylene glycol, 1,2-propylene glycol, 1,3-propanediol, 1,4-butanediol, 1,5-pentanediol, neopentyl glycol, 1,6-hexanediol, 3-methyl-1,5-pentanediol, 1,9-nonanediol, 2-ethyl-2-butylpropanediol, neopentyl glycol hydroxypivalate, dimethylol heptane, 2,2,4-trimethyl-1,3-pentanediol and the like. Examples of alicyclic glycol include 1,4-cyclohexanediol, 1,4-cyclohexanedimethanol, tricyclodecanediol, tricyclodecanedimethylol, spiro glycol, hydrogenated bisphenol A, ethylene oxide adduct with hydrogenated bisphenol A and propylene oxide adduct with hydrogenated bisphenol A and the like. Examples of ether bond-containing glycol include diethylene glycol, triethylene glycol, dipropylene glycol and the like. Where necessary, polyethylene glycol, polypropylene glycol, polytetramethylene glycol, ethylene oxide adduct with neopentyl glycol, propylene oxide adduct with neopentyl glycol may be used. Examples of aromatic group-containing glycol include ethylene oxide adducts with paraxylene glycol, methaxylene glycol, orthoxylene glycol, 1,4-phenylene glycol and 1,4-phenylene glycol, bisphenol A, and glycols obtained by adding 1 to several moles of ethylene oxide or propylene oxide to two phenolic hydroxyl groups of bisphenols such as ethylene oxide adduct with bisphenol A and propylene oxide adduct with bisphenol A.

For a smooth grafting in the present invention, a polymerizable unsaturated bond needs to be introduced into a polyester forming a main chain. Examples of dicarboxylic acid having a polymerizable unsaturated bond include fumaric acid, maleic acid, maleic anhydride, itaconic acid, citraconic acid and the like as α, β-unsaturated dicarboxylic acids, and 2,5-norbornene dicarboxylic anhydride, tetrahydrophthalic anhydride and the like as alicyclic dicarboxylic acid containing an unsaturated double bond.

In addition, hydroxycarboxylic acids such as p-hydroxybenzoic acid, p-(2-hydroxyethoxy)benzoic acid, dimethylol propionate, hydroxypivalinic acid, γ-butyrolactone and ε-caprolactone can be used as necessary.

The amount to be copolymerized of dicarboxylic acid containing an unsaturated double bond is preferably 0–20 mol %, more preferably 0.5–12 mol %, still more preferably 1–9 mol %, of the total acid component. When dicarboxylic acid containing a polymerizable unsaturated double bond exceeds 20 mol %, various physical properties undesirably fall to a greater degree.

Examples of glycol containing an unsaturated double bond include glycerine monoallyl ether, trimethylolpropane monoallyl ether, pentaerythritol monoallyl ether and the like. The glycol having a polymerizable unsaturated double bond is contained in a proportion of preferably 0–20 mol %, more preferably 0.5–12 mol %, still more preferably 1–9 mol %, of the total glycol component. When the glycol having a polymerizable unsaturated double bond exceeds 20 mol %, various physical properties undesirably fall to a greater degree.

The polyester forming the main chain may comprise, where necessary, about 0–5 mol % polycarboxylic acids and/or polyols having three or more functional groups copolymerized therein. The polyearboxylic acid having three or more functional groups is exemplified by trimellitic acid (anhydrous), pyrromellitic acid (anhydrous), benzophenone tetracarboxylic acid (anhydrous), trimesic acid, ethylene glycol bis(anhydrotrimellitate), glycerol tris (anhydrotrimellitate) and the like, and the polyol having three or more functional groups is exemplified by glycerol, trimethylol ethane, trimethylol propane, pentaerythritol and the like. When polycarboxylic acid and/or polyol having three or more functional groups are/is used, the amount to be copolymerized is 0–5 mol %, preferably 0–3 mol %, of the total acid component or total glycol component. When it exceeds 5 mol %, the mechanical property of the paint film, such as elongation at break, may be degraded.

The polyester forming the main chain has a weight average molecular weight of generally 500–200000, preferably 500–100000, more preferably 1000–70000, particularly preferably 2000–50000. When the weight average molecular weight is within the range of from 500 to 200000, various properties are not degraded nor does the polyester become highly viscous during grafting or is it prevented from achieving uniform progress of the reaction.

The above-mentioned polyester can be modified into a polyurethane as necessary. This polyurethane resin consists of, for example, polyester polyol (a), organic diisocyanate compound (b) and where necessary, chain extender (c) having an active hydrogen, and has a weight average molecular weight of 500–200000, urethane bond content of 500–4000 equivalent/$10^6$ g.

Examples of the polyester polyol (a) include compounds exemplified as dicarboxylic acid component and glycol component of the aforementioned polyester. Preferred are those having a molecular weight of 500–10000, wherein both end groups or side chain are/is hydroxy.

Examples of the organic diisocyanate compound (b) include hexamethylene diisocyanate, tetramethylene diisocyanate, 3,3'-dimethoxy-4,4'-biphenylene diisocyanate, p-xylylene diisocyanate, m-xylylene diisocyanate, 1,3-diisocyanate methylcyclohexane, 4,4'-diisocyanate dicyclohexane, 4,4'-diisocyanate cyclohexylmethane, isophorone diisocyanate, 2,4-tolylene diisocyanate, 2,6-tolylene diisocyanate, p-phenylene diisocyanate, diphenylmethane diisocyanate, m-phenylene diisocyanate, 2,4-naphthalene diisocyanate, 3,3'dimethyl-4,4'-biphenylene diisocyanate, 4,4'-diisocyanate diphenyl ether, 1,5-naphthalene diisocyanate and the like.

Examples of the chain extender (c) having an active hydrogen include glycols such as ethylene glycol, propylene glycol, neopentyl glycol, 2,2-diethyl-1,3-propanediol, diethylene glycol, spiro glycol, polyethylene glycol and the like and amines such as hexamethylene diamine, propylene diamine, hexamethylene diamine and the like.

The aforementioned polyurethane can be produced by a known method in a solvent at a reaction temperature of 20–150° C. in the presence or absence of a catalyst. The solvent to be used here may be, for example, ketones such as methyl ethyl ketone, methyl isobutyl ketone and cyclohexanone; aromatic hydrocarbons such as toluene and xylene; esters such as ethyl acetate and butyl acetate; and the like. The catalyst to promote the reaction includes amines, organic tin compounds and the like.

The aforementioned polyurethane preferable contains an average of 0–30, preferably 0.1–20, and more preferably 0.5–15, polymerizable double bonds per urethane chain to enhance grafting efficiency of radical polymerizable monomer.

For example, the polymerizable double bond can be introduced by the following methods:

1) addition of unsaturated dicarboxylic acid such as fumaric acid, maleic acid, itaconic acid, norbornene dicarboxylic acid and the like to polyester polyol, 2) addition of allyl ether group-containing glycol to polyester polyol, 3) use of allyl ether group-containing glycol as a chain extender and These methods may be used alone or in combination.

Examples of the radical polymerizable monomer constituting the polymer which is a side chain of the graft polymer of the present invention include (meth)acrylic acid and (meth)acrylic esters, which are specifically acrylic acid, methyl acrylate, ethyl acrylate, butyl acrylate, isopropyl acrylate, ethylhexyl acrylate, isobornyl acrylate, hydroxyethyl acrylate, hydroxyisopropyl acrylate, dimethylaminoethyl acrylate, methacrylic acid, methyl methacrylate, ethyl methacrylate, butyl methacrylate, glycidyl methacrylate, hydroxyethyl nethacrylate, dimethylaminoethyl methacrylate, cyclohexyl methacrylate, reaction products of 2-hydroxyethyl acrylate (HEA) or 2-hydroxyethyl methacrylate (HEMA) with aromatic compound such as phenoxyethyl acrylate, phenoxyethyl methacrylate, benzyl acrylate and benzyl methacrylate; esters of HEA or HEMA with phthalic acid derivatives (e.g., 2-acryloyloxyethylhydrogen phthalate), or reaction product of acrylic acid or methacrylic acid with phenyl glycidyl ether, i.e., 2-hydroxy-3-phenoxypropyl (meth)acrylate; and the like. The radical polymerizable monomer having a nitrogen atom is exemplified by acrylamide, methacrylamide, dimethyl acrylamide, N-methylol acrylamide, acryloylmethyl propanesulfonic acid, acrylonitrile and methacrylonitrile. Fumaric acid and fumaric monoesters and diesters such as monoethyl fumarate, diethyl fumarate and dibutyl fumarate; maleic acid and anhydrides thereof, maleic monoesters and diesters such as monoethyl maleate, diethyl maleate and dibutyl maleate; itaconic acid and anhydrides thereof, and itaconic monoesters and diesters; maleimides such as phenyl maleimide can be also used. In addition, vinyl radical polymerizable monomers such as styrene and styrene derivatives (e.g., α-methyl styrene, t-butyl styrene and chloromethyl styrene); N-vinyl pyrrolidone; vinyl esters such as vinyl acetate; and vinyl ethers such as vinyl butyl ether and vinyl isobutyl ether, and allyl radical polymerizable monomers such as allyl alcohol, glycerine monoallyl ether, pentaerythritol monoallyl ether and trimethylolpropane monoallyl ether; and the like can be used.

The radical polymerizable monomer to be used in the present invention may be one or more kinds of the aforementioned radical polymerizable monomers.

The graft polymer of the present invention can be obtained by graft polymerizing the above-mentioned polyester or polyester polyurethane (base resin) with a radical polymerizable monomer. The graft polymerization in the present invention is carried out by reacting a base resin which has been dissolved, dispersed or melted, with a radical initiator and one or more kinds of radical polymerizable monomer.

The reaction product after graft polymerization generally comprises a graft polymer and a base resin which did not undergo graft polymerization and a single polymer of radical polymerizable monomer which did not undergo graft polymerization with the base resin. The polyester resin of the present invention encompasses not only a graft polymer but also a reaction mixture containing a base resin and the like. In general terms, when the graft polymer ratio of the reaction mixture is low and the ratios of non-grafted base resin and non-grafted single polymer are high, modification effect becomes low. Rather, an adverse influence such as whitening of the coating film due to the non-grafted single polymer can be observed. Accordingly, reaction conditions to achieve a high production ratio of the graft polymer of not less than 50 wt % is essential.

When grafting a radical polymerizable monomer with a base resin, a radical polymerizable monomer (mixture) and a radical initiator may be added simultaneously to the base resin. Alternatively, they may be added separately by dropwise addition over a certain time and continuously heated with stirring for a certain time to allow progress of the reaction. The temperature for graft polymerization is preferably within the range of 50–120° C.

The preferable weight ratio of the base resin to radical polymerizable monomer suited for the object of the present invention is base resin/side chain moiety of 10/90-99/1, more preferably 25/75-95/5.

When the weight ratio of the base resin is 10–99 wt %, the superior property of the base resin, i.e., dyeing property, can be sufficiently exerted, and the ratio of the base resin grafted in the graft product is enough to show high effects of modification.

The weight average molecular weight of the graft chain moiety in the present invention is generally 1000–20000, preferably 1000–100000. When a graft polymerization is performed by a radical reaction, a weight average molecular weight of the graft chain of not less than 1000 generally facilitates control of the molecular weight, and a weight average molecular weight of the graft chain of not more than 200000 results in a small increase in the viscosity during polymerization and easy control of the polymerization in the objective homogeneous system. The molecular weight of the graft chain moiety can be controlled by appropriately combining the amount of polymerization initiator, time of dropwise addition of the monomer, polymerization time, reaction solvent, composition of the monomer and, where necessary, chain transfer agent and polymerization inhibitor.

The radical polymerization initiator to be used in the present invention may be known organic peroxides or organic azo compounds. Examples of the organic peroxide include benzoyl peroxide and t-butyl peroxypivalate, and examples of the organic azo compound include 2,2'-azobisisobutyronitrile and 2,2'-azobis(2,4-dimethylvaleronitrile).

The radical initiator is used for the graft polymerization in an essential amount of at least not less than 0.2 wt %, preferably not less than 0.5 wt %, of the radical polymerizable monomer. While the upper limit is not set, it is preferably less than 10 wt % of the above-mentioned monomer.

A chain transfer agent such as octyl mercaptane, dodecyl mercaptane and mercaptoethanol may be added as necessary to control the graft chain length. In this case, it is preferably added in an amount of 0–20 wt % of the radical polymerizable monomer.

The reaction solvent for the graft polymerization is exemplified by conventionally used good solvents for polyester and polyester polyurethane such as ketones (e.g., methyl ethyl ketone, methyl isobutyl ketone and cyclohexanone), aromatic hydrocarbons (e.g., toluene and xylene), esters (e.g., ethyl acetate and butyl acetate), which are used solely or in combination, as well as various poor solvents for polyester such as various alcohols and water, which are used solely or in combination, and a mixed solvent of the above-mentioned good solvent and poor solvent.

When a graft polymerization is performed in a good solvent for the base resin wherein the solvent is freely water miscible or addition of a water soluble organic solvent such as alcohols to the solvent makes the solvent water miscible, a graft polymerization product containing the solvent is neutralized directly with a basic compound while it is in the heated state, and prepared into an aqueous dispersion by the addition of water. Inasmuch as simple distillation or azeotropic distillation using water of the produced aqueous dispersion enables elimination of the organic solvent from the reaction system, such reaction solvent is preferably used in the present invention. When the solvent of the graft polymerization is not water miscible, a graft product is obtained by drying after graft polymerization and dispersed in water.

When a graft polymerization is carried out in a poor solvent for the base resin, the graft polymerization may proceed with the base resin being dispersed in the solvent. In this case, various dispersion aids may be used.

The solvent for the graft polymerization to practice the present invention may be a single solvent or a mixed solvent. The solvent preferably has a boiling point of 50–250° C. A boiling point exceeding 250° C. is undesirable, since evaporation proceeds slowly and the solvent cannot be sufficiently removed by drying even at a high temperature. A boiling point less than 50° C. is again undesirable when a graft polymerization is carried out using same as a solvent, since handling thereof may be endangered due to the necessary use of an initiator which causes radical cleavage at a temperature less than 50° C.

The good solvent of polyester resin includes the above-mentioned ketones, cyclic ethers such as tetrahydrofuran and dioxane, glycol ethers such as propyleneglycol methyl ether, propyleneglycol propyl ether, ethyleneglycol ethyl ether, ethyleneglycol butyl ether, carbitols such as methyl carbitol, ethyl carbitol and butyl carbitol, lower esters of glycols or glycol ether, such as ethylene glycol diacetate, ethylene glycol ethyl ether acetate, ketone alcohols and diacetone alcohol, N-substituted amides such as dimethylformamide, dimethylacetamide and N-methylpyrrolidone, the above-mentioned aromatic solvents and esters. The poor solvent for polyester and polyester polyurethane includes lower alcohols, lower carboxylic acids, lower amines, water and the like.

The polyester resin of the present invention has a reduced viscosity of 0.15–1.5, preferably 0.17–1.3. When said reduced viscosity is less than 0.15, the strength that a dyeable layer is required to have as a coating film becomes too low. When it exceeds 1.5, the viscosity of the solution to be coated on a substrate becomes too high to prevent easy handling.

The polyester resin of the present invention preferably has a tan δ (dielectric loss) peak temperature of not less than 40° C., more preferably not less than 45° C. When it is not less than 40° C., the coating film is free of blocking. The upper limit thereof is preferably 100° C. When it is too high, the dyeing property of the polyester resin becomes poor.

The polyester resin of the present invention has a Tg of not less than 15° C., preferably not less than 20° C., more preferably not less than 25° C. When it is less than 15° C., blocking of the paint film and the durability of an image become poor to make the image receiver undesirable. The upper limit is preferably 80° C., more preferably 60° C.

When the above-mentioned polyester resin is used as a dyeable resin to be used for a dyeable layer of a sublimation transfer image receiver, the following resins can be concurrently used with said polyester resin. Examples of the resin to be concurrently used include polyvinyl resin, polycarbonate resin, polyacrylic resin, polyester resin, polymethacrylate resin, polyolefin resin, cellulose derivative resin, polyether resin, polyvinyl chloride and modified resins thereof. While the amounts thereof are not particularly limited, they are 5–80 parts by weight, more preferably 10–70 parts by weight relative to 100 parts by weight of the polyester resin.

The polyester resin of the present invention may be thermoset or crosslinked for an improved durability. The curing agent used for thermosetting includes, for example, silicone resin, melamine resin, phenol-formaline resin, epoxy resin, isocyanate resin and the like. For crosslinking, ionic crosslinking, radiation crosslinking and the like may be used.

For an improved releasability from a heat transfer sheet, various lubricants can be added. Specific examples of the lubricant include fluorine resin, silicon resin, and surfactants such as organic sulfonate compound, organic phosphate compound, organic carboxylate compound and the like.

The light resistance of a recorded image may be enhanced by adding UV absorber, antioxidant and the like.

When the polyester resin of the present invention is used as a dyeable resin, the polyester resin of the present invention is preferably added to a dyeable resin in a proportion of at least 1 wt %, more preferably 5–100 wt % of a dyeable resin.

When a dyeable resin is coated on a substrate, the polyester resin of the present invention and other resins to be added as necessary, additives and the like are dissolved in a solvent before coating; or a nonaqueous dispersion, aqueous dispersion or aqueous solution (without solvent) may be used for this end.

When a solution or dispersion is coated on a substrate, it has a solid content of generally about 5–70 wt %.

The kind of substrate is not particularly limited and paper, synthetic paper, various films and various sheets can be used.

The thickness of the substrate is generally 20–200 μm and that of a dyeable layer is generally about 0.1–50 μm.

The graft polymer characteristic of the polyester resin of the present invention is considered to have simultaneously achieved the dyeing property of the main chain moiety and impartation of heat resistance to a paint film afforded by the rigidity of the side chain, as a result of the main chain and a grafted side chain of a polyester alone having superior dyeing property of a sublimation dye, or polyester and polyurethane in combination.

The present invention is explained in the following by way of Examples. In Examples, a mere "part" means "part by weight" and "%" means "weight %". The determination items followed the methods given in the following and the test results are shown in Tables.

(1) reduced viscosity

A polyester resin (0.01 g) was dissolved in a mixed solvent (25 cc) of phenol/tetrachloroethane (weight ratio 6/4) and viscosity was determined using an Ubbelohde viscometer at 30° C.

(2) tan δ

Determined using a dynamic visco-elasticity meter. The determination frequency was 110.00 Hz, sample was adjusted to a thickness of about 0.1 mm, length 15.0 mm, width 4.0 mm and subjected to determination.

(3) glass transition temperature (Tg)

Using a differential scanning calorimeter (DSC), Tg was determined at a temperature elevation rate of 20° C./min. Sample (5 mg) was placed in an aluminum presser lid type container and subjected to determination after crimping.

(4) determination of weight average molecular weight of graft side chain

The product obtained by graft polymerization was subjected to hydrolysis of copolymerized polyester in a KOH/water-methanol solution under reflux. The hydrolyzate was extracted under acidic conditions using THF and acrylic polymer was purified by reprecipitation with hexane. This polymer was determined by a GPC apparatus (manufactured by Shimazu Seisakusho, tetrahydrofuran solvent, polystyrene conversion) and the weight average molecular weight of the graft side chain was calculated.

(5) polyester graft efficiency

The product obtained by graft polymerization was subjected to determination for 220 MHz $^1$H NMR and 55 MHz $^{13}$C MR (manufactured by VARIAN, measurement solvent $CDC_{13}$/DMSO-$d_6$) and graft efficiency was determined based on the intensity of a signal derived from double bond of double bond-containing component copolymerized with polyester.

polyester graft efficiency=[(1−(relative intensity of a signal derived from double bond of double bond-containing component of graft polymerization product/relative intensity of a signal derived from double bond of double bond-containing component of starting material polyester)]×100 (%)

The relative intensity was calculated from the comparison with internal signal intensity as the standard signal.

(6) evaluation of density of printed image

An image receiving sheet and a heat transfer sheet were superposed so that a dye-receiving layer and a color material layer were brought into contact. The heat transfer sheet was heated from the heat transfer sheet substrate side with a thermal head at 0.7 W/dot head output, head heating time 8 mS, dot density 3 dots/mm to transfer cyan color dye in the color material layer to the dye-receiving layer. The density of the transferred image thus obtained was determined by reflection densitometer (DM-600, manufactured by Dainippon Screen Co., Ltd.).

(7) evaluation of heat resistance (discoloration, fading percentage)

The density of the image of the image receiver to which cyan dye had been transferred was determined. The image receiver was left standing (aging) in a dark place at 60° C. for 168 hours, and the density of the image was evaluated from the comparison with the density before the heat resistance test and expressed by dye retention (%).

(8) evaluation of image preservation stability

An image receiver to which cyan dye had been transferred was left standing (aging) in a dark place at 50° C. for one week, and the post-aging printed dots were observed using a 40× magnification glass.

◯: no difference from immediately after printing and printed dots could be confirmed X: apparent blurring due to the diffusion of dye between printed dots (9) evaluation of blocking property One hundred sheets of image receiver were superposed and left standing in a dark place at 50° C. for one day. Thereafter, the surface of the image receiver and the reverse side of the image receiver were observed every time the image receiver was peeled off.

◯: no difference and with gloss

X: apparent roughening of the image receiving surface

PRODUCTION EXAMPLE 1
(Production of polyesters A to C)

Dimethyl terephthalate (466 parts), dimethyl isophthalate (466 parts), 1,6-hexanediol (300 parts), ethylene glycol (443 parts) and tetra-n-butyl titanate (0.52 part) were charged in a stainless steel autoclave equipped with a stirrer, a thermometer and a partial reflux condenser, and the mixture was subjected to ester interchange by heating from 160° C. to 220° C. over 4 hours. Then, fumaric acid (23 parts) was added and the mixture was heated from 200° C. to 220° C. over one hour for esterification. Then, the mixture was heated to 255° C. and the pressure of the reaction system was gradually reduced to 0.2 mmHg, at which the reaction was continued for 1.5 hours to give polyester resin A. The obtained polyester A was pale-yellow and transparent, and had a reduction viscosity of 0.53. The polyester resins B and C obtained by a similar production method are shown in Table 1.

TABLE 1

| polyester | A | B | C |
|---|---|---|---|
| [starting material of polyester] | | | |
| terephthalic acid | 48 | | |
| isophthalic acid | 47 | 33 | 33 |
| cyclohexane dicarboxylic acid | | 62 | 62 |
| fumaric acid | 5 | 5 | 5 |
| 1,6-hexanediol | 50 | | 50 |
| ethylene glycol | 50 | 50 | 50 |
| neopentyl glycol | | 50 | |
| [properties of polyester] | | | |
| Reduced viscosity (dl/g) | 0.53 | 0.40 | 0.75 |
| Tg (° C.) | 19 | 21 | 3 |

(Production of polyester resin)

Polyester A (51 parts), methyl ethyl ketone (40 parts) and toluene (40 parts) were charged in a reactor equipped with a stirrer, a thermometer, a refluxing device and a volumeric drop device, and the mixture was heated and stirred to dissolve the resin with refluxing. After the complete dissolution of the resin, a solution of a mixture of cyclohexyl methacrylate (35 parts) and styrene (2 parts), and azobisisobutylnitrile (1 part) dissolved in methyl ethyl ketone (64 parts) and toluene (64 parts) was dropwise added to the polyester solution over 1.5 hours. The mixture was reacted for 3 more hours to give a polyester resin AG solution. The obtained polyester resin AG had a reduction viscosity of 0.45, peak temperature of tan δ 46° C. and Tg 20° C. The polyester resins AG' to CG obtained by a similar production method are shown in Table 2.

TABLE 2

| | starting material of polyester resin | | | | properties of polyester resin | | |
|---|---|---|---|---|---|---|---|
| polyester resin | polyester (part) | monomer (part) | | | Reduced viscosity (dl/g) | Tan δ (° C.) | Tg (° C.) |
| | | MMA | CHMA | St | | | |
| AG | A58 | | 40 | 2 | 0.45 | 46 | 20 |
| AG' | A58 | 12 | 28 | 2 | 0.41 | 49 | 21 |
| BG | B58 | | 40 | 2 | 0.59 | 48 | 19 |
| CG | C50 | 45 | | 5 | 0.60 | 23 | 7 |

Note
MMA: methyl methacrylate
CHMA: cyclohexyl methacrylate
St: styrene

PRODUCTION EXAMPLE 2
(Production of polyesters D to F)

Dimethyl terephthalate (466 parts), dimethyl isophthalate (466 parts), neopentyl glycol (401 parts), ethylene glycol (443 parts) and tetra-n-butyl titanate (0.52 part) were charged in a stainless steel autoclave equipped with a stirrer, a thermometer and a partial reflux condenser, and the mixture was subjected to ester interchange by heating from 160° C. to 220° C. over 4 hours. Then, fumaric acid (23 parts) was added and the mixture was heated from 200° C. to 220° C. over one hour for esterification. Then, the mixture was heated to 255° C. and the pressure of the reaction system was gradually reduced to 0.2 mmHg, at which the reaction was continued for 1.5 hours to give polyester resin D. The obtained polyester D was pale-yellow and transparent, and had a reduced viscosity of 0.55 and Tg of 62° C. Polyester resin E obtained by a similar production method is shown in Table 3.

TABLE 3

| polyester | D | E |
|---|---|---|
| [starting material of polyester] | | |
| terephthalic acid | 48 | 42 |
| isophthalic acid | 47 | 42 |
| sebacic acid | | 11 |
| fumaric acid | 5 | 5 |
| neopentyl glycol | 50 | 50 |
| ethylene glycol | 50 | 50 |
| [properties of polyester] | | |
| Reduced viscosity (dl/g) | 0.55 | 0.56 |
| Tg (° C.) | 62 | 47 |

(Production of polyester resin)

Polyester D (65 parts) and methyl ethyl ketone (50 parts) were charged in a reactor equipped with a stirrer, a thermometer, a refluxing device and a volumeric drop device, and the mixture was heated and stirred to dissolve the resin in a refluxing state. After the complete dissolution of the resin, a solution of a mixture of methyl methacrylate (33 parts) and hydroxyethyl methacrylate (2 parts), and azobisisobutylnitrile (1 part) dissolved in methyl ethyl ketone (12 parts) was dropwise added to the polyester solution over 1.5 hours. The mixture was reacted for 3 more hours to give a polyester resin DG solution. The obtained polyester resin DG had a reduced viscosity of 0.60, peak temperature of tan δ 85° C. and Tg 42° C. The molecular weight of the side chain of the obtained graft polymer was 8000 and graft efficiency by NMR was not less than 80%. The polyester resins EG and EG' obtained by a similar production method are shown in Table 4.

TABLE 4

| polyester resin | starting material of polyester resin | | | | properties of polyester resin | | |
|---|---|---|---|---|---|---|---|
| | polyester (part) | monomer (part) | | | Reduced viscosity (dl/g) | Tan δ (° C.) | Tg (° C.) |
| | | MMA | HEMA | CHMA | | | |
| DG | D50 | 45 | 5 | | 0.60 | 42 | 85 |
| EG | E65 | 33 | 2 | | 0.68 | 36 | 65 |
| EG' | E65 | | 2 | 32 | 0.59 | 34 | 60 |

Note
MMA: methyl methacrylate
HEMA: hydroxyethyl methacrylate
CHMA: cyclohexyl methacrylate

EXAMPLE 1

Polyester resin AG was diluted with a mixed solvent of methyl ethyl ketone:toluene=1:1 to give a 20% solution. To this solution was added epoxy-modified silicone oil (KF-102, manufactured by Shin-Etsu Chemical Co., Ltd.) in a proportion of 10% by weight of the above-mentioned resin component. The mixture was applied on a 150 μm-thick synthetic paper (Yupo PPG-150, manufactured by Oji Yuka Co., Ltd.) with a wire bar, so that the thickness of dry coating became 4 μm. The above-mentioned sheet was dried at 120° C. for 30 minutes to give a dye receiving layer.

Examples 2 and 3

A dye receiving layer was formed on polyester resins AG' and BG in the same manner as in Example 1 for Examples 2 and 3, respectively.

Comparative Example 1

In the same manner as in Example 1 using polyester resin CG, a dyeable layer was formed for Comparative Example 1.

The dyeing sensitivity, heat resistance, image preserving property and blocking property of the dyeable layers obtained in Examples 1–3 and Comparative Example 1 were evaluated, the results of which are shown in Table 5.

TABLE 5

| | dyeing sensitivity | heat resistance (%) | image preserving property | blocking property |
|---|---|---|---|---|
| Example 1 | 2.4 | 98 | ◯ | ◯ |
| Example 2 | 2.4 | 95 | ◯ | ◯ |
| Example 3 | 2.5 | 97 | ◯ | ◯ |
| Comp. Ex. 1 | 2.4 | 70 | × | × |

EXAMPLE 4

Polyester resin DG was diluted with a mixed solvent of methyl ethyl ketone:toluene=1:1 to give a 20% solution. To this solution was added epoxy-modified silicone oil (KF-102, manufactured by Shin-Etsu Chemical Co., Ltd.) in a proportion of 10% by weight of the above-mentioned resin component. The mixture was applied on a 150 μm-thick synthetic paper (Yupo PPG-150, manufactured by Oji Yuka Co., Ltd.) with a wire bar, so that the thickness of dry coating became 4 μm. The above-mentioned sheet was dried at 120° C. for 30 minutes to give a dye receiving layer (dye receiving layer). The density of transferred image (dyeing sensitivity), heat resistance, image preserving property and blocking property of the dyeable layers obtained were evaluated, the results of which are shown in Table 6.

EXAMPLES 5, 6

In the same manner as in Example 4 using polyester resins EG and EG', a dyeable layer was formed for Examples 5 and 6.

COMPARATIVE EXAMPLE 2

In the same manner as in Example 4 using polyester E, a dyeable layer was formed for Comparative Example 2.

The dyeing sensitivity, heat resistance, image preserving property and blocking property of the dyeable layers obtained in Examples 5 and 6 and Comparative Example 2 were evaluated, the results of which are shown in Table 6.

TABLE 6

| | dyeing sensitivity | heat resistance (%) | image preserving property | blocking property |
|---|---|---|---|---|
| Example 4 | 2.4 | 98 | ◯ | ◯ |
| Example 5 | 2.4 | 95 | ◯ | ◯ |
| Example 6 | 2.5 | 97 | ◯ | ◯ |
| Comp. Ex. 2 | 2.4 | 89 | × | × |

INDUSTRIAL APPLICABILITY

The image-receiving layer of the sublimation heat-sensitive recording paper which comprises a polyester resin to be obtained by the present invention as a main component shows high dyeing sensitivity, and the images obtained thereby are superior in durability and preservation stability. Thus, the polyester resin is industrially useful as a dyeable resin for a sublimation heat-sensitive recording paper.

What is claimed is:

1. A sublimation transfer image receiver, comprising a substrate and a dyeable resin layer on said substrate, said dyeable resin layer comprising a dyeable resin and a lubricant, said dyeable resin comprising a polyester resin having a glass transition temperature of not less than 15° C. and a reduced viscosity of 0.15–1.5 dl/g, said polyester resin comprising a grafted polyester comprising a main chain polyester and a graft chain, said graft chain comprising polymers of a radical polymerizable unsaturated monomer selected from the group consisting of methyl acrylate, ethyl acrylate, butyl acrylate, isopropyl acrylate, ethylhexyl acrylate, isobornyl acrylate, hydroxyethyl acrylate, hydroxyisopropyl acrylate, methyl methacrylate, ethyl methacrylate, butyl methacrylate, glycidyl methacrylate, hydroxyethyl methacrylate, cyclohexyl methacrylate, phenoxyethyl acrylate, phenoxyethyl methacrylate, benzyl acrylate, benzyl methacrylate, acryloyloxyethylhydrogen phthalate, 2-hydroxy-3-phenoxypropyl acrylate, 2-hydroxy-3-phenoxypropyl methacrylate, monoethyl fumarate, diethyl furmarate dibutyl fumarate, maleic anhydride, monoethyl maleate, diethyl maleate, dibutyl maleate, itaconic anhydride, itaconic esters, phenyl maleimide, styrene, α-methyl styrene, t-butyl styrene, chloromethyl styrene, N-vinyl pyrrolidone, vinyl acetate, vinyl butyl ether, vinyl isobutyl ether, allyl alcohol, glycerine monoallyl ether, pentaerythritol monoallyl ether and trimethylolpropane monoallyl ether.

2. The sublimation transfer image receiver of claim 1, wherein said polyester resin has a peak temperature of tan δ of not less than 40° C.

3. The sublimation transfer image receiver of claim 1, wherein said polyester resin has a glass transition temperature of not less than 25° C.

4. The sublimation transfer image receiver of claim 1, wherein said polyester resin further comprises an ungrafted polyester and a polymer having a structure of said graft chain but ungrafted to said grafted polyester.

5. The sublimation transfer image receiver of claim 4, wherein said graft chain of said grafted polyester is formed by polymerizing the unsaturated monomer by a radical polymerization.

* * * * *